Aug. 4, 1953     E. E. TURNER, JR     2,648,060
CODED IMPULSE RESPONSIVE SECRET SIGNALING SYSTEM
Original Filed Sept. 29, 1945     6 Sheets-Sheet 1

INVENTOR
EDWIN E. TURNER, JR
BY
ATTORNEY

Aug. 4, 1953      E. E. TURNER, JR      2,648,060
CODED IMPULSE RESPONSIVE SECRET SIGNALING SYSTEM

Original Filed Sept. 29, 1945      6 Sheets-Sheet 2

INVENTOR
EDWIN E. TURNER, JR
BY
ATTORNEY

Aug. 4, 1953 E. E. TURNER, JR 2,648,060
CODED IMPULSE RESPONSIVE SECRET SIGNALING SYSTEM

Original Filed Sept. 29, 1945 6 Sheets-Sheet 3

INVENTOR
EDWIN E. TURNER, JR
BY
ATTORNEY

Aug. 4, 1953     E. E. TURNER, JR     2,648,060
CODED IMPULSE RESPONSIVE SECRET SIGNALING SYSTEM

Original Filed Sept. 29, 1945     6 Sheets-Sheet 4

INVENTOR
EDWIN E. TURNER, JR
BY
ATTORNEY

INVENTOR
EDWIN E. TURNER, JR
BY
ATTORNEY

INVENTOR
EDWIN E. TURNER, JR
BY
ATTORNEY

Patented Aug. 4, 1953

2,648,060

UNITED STATES PATENT OFFICE 2,648,060

CODED IMPULSE RESPONSIVE SECRET SIGNALING SYSTEM

Edwin E. Turner, Jr., West Roxbury, Mass., assignor, by mesne assignments, to Raytheon Manufacturing Company, a corporation of Delaware Original application September 29, 1945, Serial No. 619,335, now Patent No. 2,559,905, dated July 10, 1951. Divided and this application March 13, 1948, Serial No. 14,779

3 Claims. (Cl. 343—6.5)

The present application is a division of application Serial No. 619,335, filed September 29, 1945, now Patent No. 2,559,905, dated July 10, 1951.

The present invention relates to signaling systems and more particularly to identification and selective signaling systems.

The object of the invention is to provide a selective signaling system whereby a response can be elicited from a remote station in answer to a specified signal transmitted from a transmitting station. My invention has particular application, for wartime purposes, to recognition and identification of "friend" or "foe" and will be described specifically with reference to such a system.

It is conceived that a proper recognition signal system designed in accordance with this invention and using radar or other wave energy transmitting and receiving equipment will make it practically impossible for an enemy to identify himself as friendly unless he possesses all of the elements of the system together with a code which may be varied from day to day or hour to hour if necessary. In general my system comprises an arrangement for transmitting, say from a radar antenna, a coded pulse of wave energy instead of the usual single-valued pulse. The coded pulse is composed of selectively spaced unit impulses readily susceptible to a large number of variations in spacing. A receiving system at the target station may be arranged for reception from all directions in azimuth. The receiving system is provided with special decoding apparatus so that it will respond only to the coded pulse transmitted by the transmitting station. At the target station, the response of the decoding device may be used to operate an indicator or other apparatus. If desired, the decoding apparatus at the target station may be arranged so that, after response to a coded pulse, it will initiate the transmission, for example, by radar, of a second coded pulse signal having a code which is different from the first coded signal, and receiving means at the first transmitting station may be arranged to respond only to such a second coded pulse transmitted from the target station. By this means the target station can identify itself to the initial transmitting station as a friend and not an enemy.

Many arrangements for producing such identification have heretofore been proposed in the prior art. Such systems have usually, however, involved a sequence of mechanical or electrical operations at the receiving station in accordance with the time intervals between the units of a code signal. Such systems lack a sufficient variety in the possible codes. They also involve the possibility and even the probability of improper timing between the coding and decoding devices, as well as the likelihood of operation due to stray pulses. In the present invention these difficulties are eliminated by arranging the coding and decoding devices in such a way that the time intervals involved depend upon the velocity of wave energy in a homogeneous conducting medium such as upon the velocity of sound in a sound conducting medium. Furthermore the present invention provides for the examination of the selective response producing coded pulse as a whole, rather than in sequence, as heretofore.

The invention will best we understood from the following description taken in connection with the accompanying drawings in which.

My invention is herein decribed as applied primarily to a radar signaling system, that is, a system in which short impulses of ultra high frequency electromagnetic waves are transmitted in the form of a beam and reflections from a target are received, and cause to operate an indicator for the purpose of determining the distance and direction of the target. Such a transmitting station may be installed on land, at airports or other points or it may be installed on a ship. In such arrangements the system may be used to search for enemy aircraft or other ships. Friendly aircraft and ships may likewise become targets in which case it becomes important to be able to distinguish friendly targets from enemy targets. The present invention provides arrangements for producing such identification and involves suitable installations on the friendly targets. While my invention will be described with specific reference to radar identification systems it will be understood by those skilled in the art that it has application to other types of selective signaling as hereinafter described.

Figure 1:
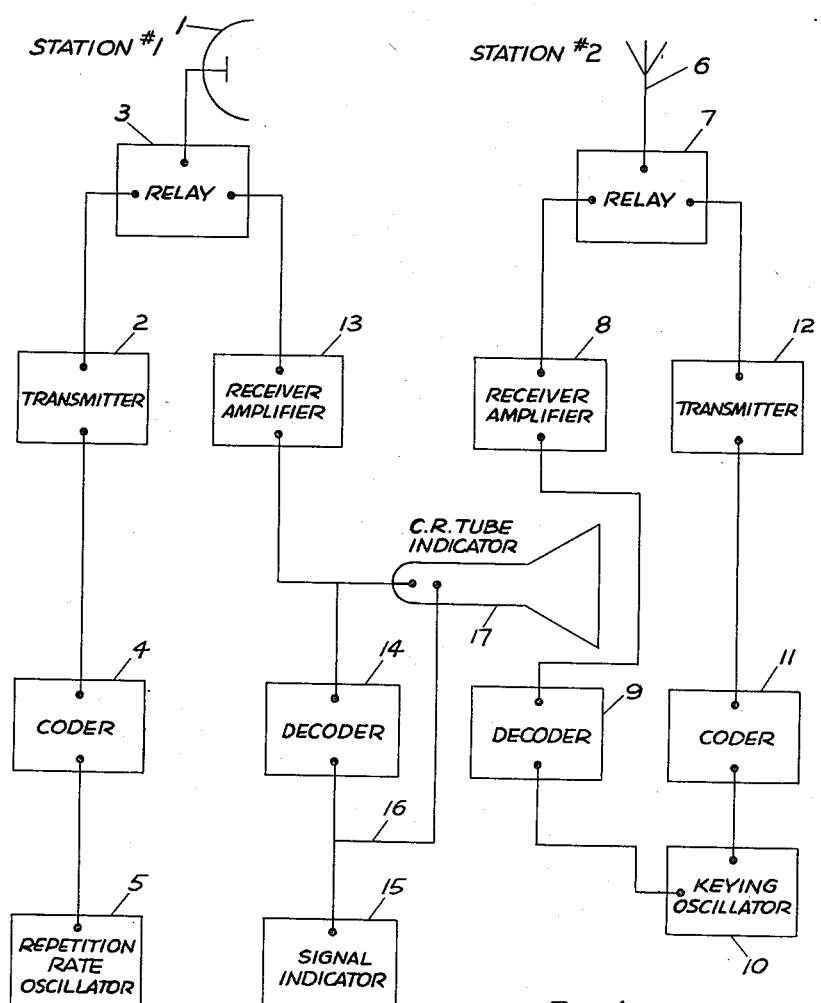
Fig. 1 is a schematic diagram of a modification providing a complete identification system.

Referring now to Fig. 1, a directional radar transmitting antenna is indicated at 1 located at station 1. The antenna 1 may be energized in any suitable manner for radar distance determination as by the transmitter 2 through a transmit-receive relay 3. For the purposes of the present invention the transmitter 2 is controlled by a coder 4 which in turn is energized by a repetition rate oscillator 5 which determines the number of signals transmitted in a given time interval. The energy transmitted from antenna 1 is received at station 2 on the antenna 6 which preferably has 360° coverage. The received energy passes through a transmit-receive relay 7 to a receiver amplifier 8 and thence to a decoder 9. The decoder permits passage through it only of signals which correspond to the code produced by the coder 4 at station 1. All other signals are rejected. If a proper signal is received it passes through the decoder 9 to initiate the operation of a keying oscillator 10 which, in turn, energizes a coder 11 at station 2. The coder 11 operates transmitter 12 to send an impulse by way of relay 7 to the antenna 6. Coder 11 preferably produces a different code from that produced by coder 4. The new coded pulse is broadcast by antenna 6 and received by antenna 1 at station 1. Here the coded pulse is passed by way of relay 3 through the radar receiver amplifier 13 to the decoder 14. The latter is adjusted to pass only signals having the code established by coder 11 at station 2. It rejects all other signals. Signals passed by the decoder 14 may operate a signal indicator 15 and may also, by way of conductor 16, operate to change the intensity or other characteristic of an indication produced by a cathode ray tube 17. Thus signals produced by the decoder 14 may be made effective to differentiate such signals from reflected signals received at station 1 from reflecting targets. Fig. 1 thus indicates diagrammatically a complete recognition signal system in which a coded pulse is transmitted from the first station, received by the second station, where it is used to initiate the transmission of a second, and preferably different, coded pulse which in turn is received by the first station and used to operate an indicator. It follows that an indication will be produced at station 1 only if station 2 has a decoder 9 responsive only to the coded pulse produced by coder 4 and provided station 2 has a coder 11 which produces a coded pulse which can operate the coder 14 at station 1. Such a four-instrument double-code system is particularly desirable when used in connection with a radar arrangement where the original coded pulse may be reflected by other targets, water waves, etc. The security offered by such a system will be even more evident from a consideration of the coding and decoding devices.

Figure 2:
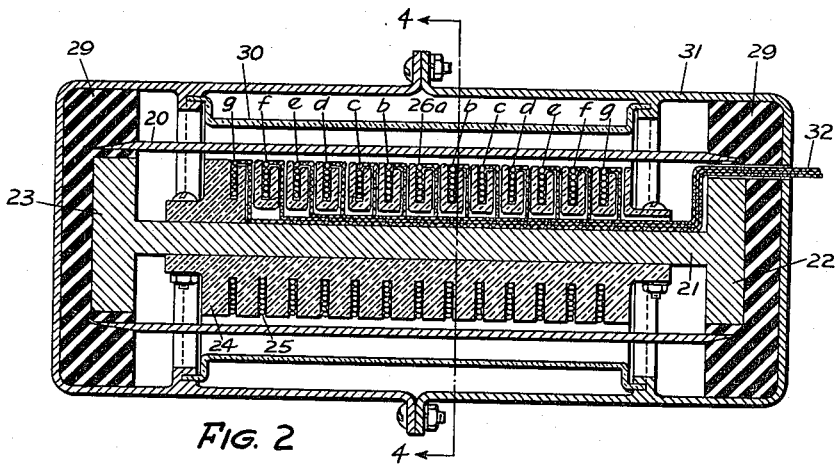
Fig. 2 shows in a longitudinal section an embodiment of an element of the coding and decoding device.
Figure 3:
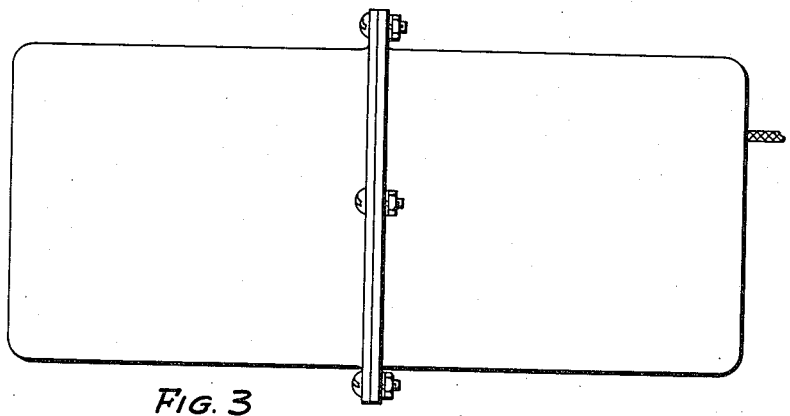
Fig. 3 shows the device in Fig. 2 in elevation.
Figure 4:
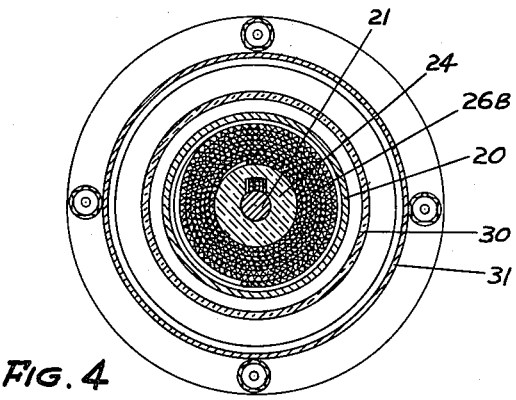
Fig. 4 shows the device in Fig. 2 in a transverse section taken along the line 4—4 in Fig. 2.

One form of coding device is illustrated in Figs. 2, 3 and 4. A magnetostrictive (for example nickel) tube 20 is mounted concentrically about an axially-disposed permanent magnet 21 having enlarged poles 22 and 23, whereby the tube 20 forms part of the magnetic flux path of the magnet. The tube 20 is thus magnetically polarized. Surrounding the magnet 21 and within the tube 20 is a non-magnetic metallic cylinder 24 having a series of radial slots 25 cut into its periphery.

In the center slot a thin electromagnetic coil 26a is wound. The coil 26a will be designated as the energizing coil. The slots on either side of the coil 26a are filled with a set of similar coils b to g on the left, Fig. 2, and preferably a second similar set b to g on the right of coil 26a. The metallic cylinder 24 on which the coils are wound provides electrostatic and electromagnetic shielding between them.

The ends of the tube 20 are imbedded in a mass of energy absorbing material 29. The material 29 may, for example, be soft rubber, Glyptol, or similar material. The ends of tube 20 may be tapered to facilitate the gradual absorption of energy by the lossers 29, and to prevent a sudden change in impedance. The whole design is to be such as to terminate both ends of the tube in its characteristic impedance when the tube is regarded as a transmission line for compressional wave impulses, so that no energy will be reflected back into the tube from its ends, but all energy traveling down the tube will be absorbed by the material 29.

An electromagnetic and electrostatic shield 30 surrounds the tube 20. The whole mechanism may finally be mounted within a case 31, leads to the coils brought out at 32.

The operation of this coding device is as follows. Let the coil 26 be energized by a short electric pulse having a time length, say, of the order of one microsecond. The electromagnetic field produced by the coil will modify the magnetic flux in the tube 20 and, due to the resulting magnetostrictive effect in the tube, produce a compressional wave pulse which will immediately start to travel along the tube 20 in both directions from the center. As the pulse travels along the tube 20 it will carry with it a magnetic disturbance which will successively link the coils b to g on the left and coils b to g on the right. There will thus be induced in each of these coils an impulse of electromotive force of approximately one microsecond time length. The time interval between the voltage impulses produced in the several coils will depend upon the physical spacing between the coils which may be made equal as shown or may be varied if desired. The time intervals between the voltage pulses will otherwise depend only upon the velocity of propagation of the compressional wave pulse through the tube 20. If the tube 20 be made of a homogeneous material the time spacing of the voltage pulses can be extremely accurately determined.

Figure 5:
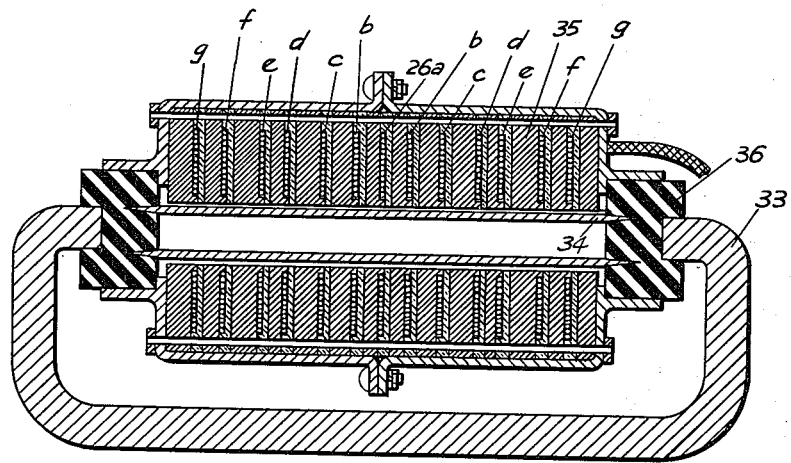
Fig. 5 shows in a longitudinal section a modification of the device shown in Fig. 2.
Figure 6:
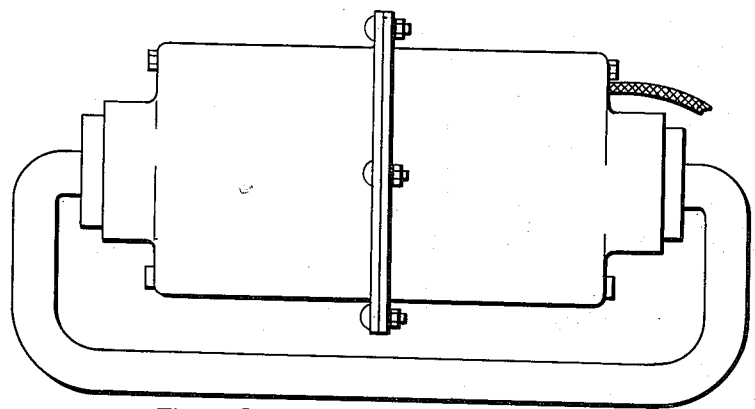
Fig. 6 shows the device of Fig. 4 in elevation.

A modification of the coding device is shown in Figs. 5 and 6 in which a permanent magnet 33 is mounted externally of the coil system or, if desired, the magnet 33 may be an electromagnet. The magnetostrictive tube 34 in this case is mounted inside of a cylindrical metallic element 35 mounted close to but spaced from the tube 34. Slots in the element 35 carry coils 26a, b to g on the left, and b to g on the right, as in element 24, Fig. 2. The ends of the tube 34 are imbedded in a losser material 36 in a similar manner to that shown in Fig. 2 so that there will be no compressional wave reflections from the ends of the tube. The operation of this arrangement is quite similar to that described with reference to Fig. 2.

Before describing further modifications of a suitable coding device it is desirable to consider in detail the manner in which the coder is used. Let us refer then to Fig. 8 which shows a schematic wiring diagram of the transmitting portions of the system.

The coding device is shown diagrammatically at 27 with the several coils lettered a to g. Coil $a$ is the initiating coil and is connected to the output of a square wave generator as will be explained later. Coil $a$ is also connected to output tube 38. The coils $b$ to $g$ on the left of coil $a$ are connected in series aiding with the correspondingly positioned coils $b$ to $g$ on the right of coil $a$. The several coils are also connected through a code selecting switch 39 which has three separately adjustable arms 40, 41 and 42, each selectively connecting with three contact studs. One of each of these studs is a blank and is grounded; the grounded studs are marked 0. The other contact studs are lettered $b$ to $g$ corresponding to the coils of the device 27 with which they are connected. The adjustable switch arms 40 to 42 are connected, respectively, to output amplifier tubes 43 to 45, whose anodes are in parallel with each other and with the anode of tube 38. The combined output of these amplifiers is coupled through condenser 46 to the radar transmitter, which may be of any conventional type and therefore is not shown in detail on the drawings but is schematically indicated in Fig. 1, at 2 for station 1 and at 12 for station 2.

The square wave generator for the energization of coil $a$ is activated by the repetition rate oscillator 5 in Fig. 1. The latter is preferably an oscillator of conventional type which produces a peaked wave form impulse of negative polarity at the rate at which it is desired to send out the recognition signals; it may conveniently be a unit of the regular radar system. The output of the repetition rate oscillator is connected to the terminals 47, 48 in Fig. 8. The peaked wave impulses are then impressed upon the grid of amplifier tube 49 whose output is connected to the cathode-grid circuit normally conducting cathode follower vacuum tube 50. The output circuit of the latter includes the primary winding 52 of the transformer 51. The output circuit of a vacuum tube 53 is similarly connected in series with transformer winding 52. The grid circuit of tube 53 is connected through winding 54 of transformer 51 and thence through resistor 55 to ground. In parallel with resistor 55 is the operating coil 57 of an impulse time delay device 58, the operation of which will be explained later. A third winding 59 on transformer 51 is connected to the grid of an amplifier tube 60 whose output circuit, by way of a connection to the cathode, is connected to the grid of the first output amplifier 38 and to the coder impulse initiating coil $a$. In the circuit just described the tube 49 is an amplifier tube; tubes 50 and 53 together comprise a square wave generator of the blocking type and tube 60 is an amplifier.

The device 58 is an acoustic time delay device and is similar in construction to the coding device previously described. It consists of a magnetically polarized magnetostrictive rod or tube 61, one end of which is embedded in a losser material 62. This material and the manner of its coupling to the tube 61 is such that this end of the tube will be terminated in the characteristic impedance of the tube 61 regarded as an acoustic transmission line. The coil 57 is a thin coil surrounding the tube 61. When an impulse is passed through the coil 57 a compressional wave impulse is produced in the magnetostrictive tube 61. The compressional wave impulse, after its production in the tube, travels along the length of the tube toward the ends in both directions from the coil 57. The impulse which travels toward the end embedded in losser material 62 is completely absorbed by this material. The impulse which travels toward the upper end of tube 61 is reflected back from that end. As it passed under the coil 57, the magnetostrictive flux change accompanying it causes a voltage pulse to be induced in the coil. This voltage will appear at the end of a definite time interval after the originating impulse appeared in the coil 57. This time interval is determined by the time required for the compressional wave discontinuity to travel from the coil 57 to the upper end of tube 61 and back to the coil 57. This time interval can be reproduced with great accuracy if the tube 61 is made of a suitably annealed homogeneous material which has a low temperature coefficient or which is protected from severe temperature changes.

The operation of the square wave impulse generator, including vacuum tubes 50 and 53, will now be apparent. A suitably peaked impulse of positive polarity impressed upon the grid of vacuum tube 50, which is normally conducting, provides a decrease in the flow of plate current, sending an impulse through the coil 52. A corresponding impulse is thereby induced in coil 54 and impressed upon the grid of tube 53, resulting in oscillation of tube 53 due to the feedback between grid and plate, the latter being normally without plate voltage by reason of the short circuit presented by tube 50. However, the impulse produced in coil 54 is also passed through coil 57, thereby producing a compressional wave impulse in the magnetostrictive tube 61. The voltage produced in the coil 57 by the compressional wave impulse reflected from the upper end of tube 61 at a definite time interval later is in such a direction as to stop the oscillation of tube 53. The potential impressed upon the grid of cathode follower tube 60 is thus rapidly increased and a short time interval later rapidly decreased, whereby a square wave impulse is impressed upon the initiating coil of the coding device. It will be understood that, for the purpose of my recognition signal system, broadly considered, an electric time delay line may be substituted for the acoustic device 58, and further that any conventional square wave generator of suitable characteristics may be used in place of the one described.

The square wave impulses are produced in the output of amplifier 60 at the rate of the repetition rate oscillator 5, Fig. 1. Each impulse will briefly energize coil $a$. There will thereby be produced in the magnetostrictive tube 20 a compressional wave disturbance which will immediately commence to travel along the tube toward the ends in both directions from the coil $a$. This compressional wave disturbance will carry with it a magnetostrictive flux change, which will successively cut the several coils $b$ to $g$, inducing voltage impulses in them. The correspondingly lettered coils to the left and to the right of coil $a$ are connected in series aiding to obtain the maximum possible voltage change. When the compressional wave impulse reaches the ends of the tube 20, all the remaining energy is absorbed by the losser 29. The time required for the compressional wave impulse to travel from the coil $a$ to the coil $g$ may be of the order of 13 microseconds, so that the time intervals between the potential impulses induced in adjacent coils $a$ to $g$ will be of the order of one microsecond. The potential impulses themselves should be of the order of one microsecond in length.

Figure 8:
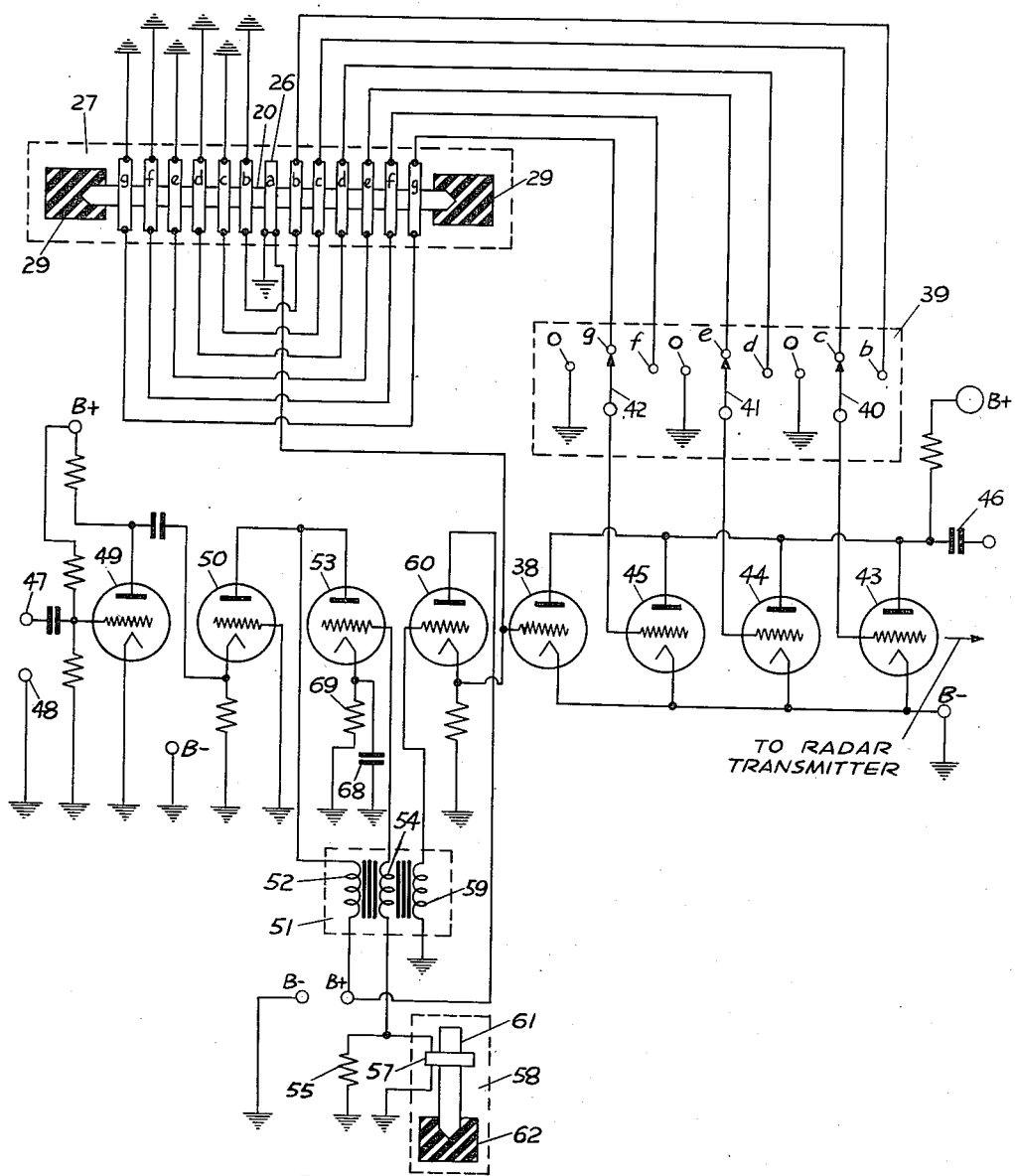
Fig. 8 is a schematic wiring diagram of transmitting positions of my system.

In the particular arrangement shown in Fig. 8 there are thus seven impulses available, spaced one microsecond from each other, from which any desired number may be selected to produce the desired code signal. As an example of a method of selecting a suitable code, and one which provides many different codes, I have shown a code selecting switch 39. This has three separate switch arms 40, 41 and 42. Each switch arm has three positions, one of which, marked 0, is grounded in each case. The other two positions are connected to adjacent coils of the coding device; thus the switch arm 40 may be adjusted to select no signal or to select the potential impulse from either coil $b$ or coil $c$. Similarly, switch arm 41 may select no signal or the signal impulse produced by coil $d$ or coil $e$, and finally switch arm 42 may select no signal or the potential impulse produced by coil $f$ or coil $g$.

If we assume, for the moment, that the code to be transmitted is selected as being that produced when the switch arms 40 to 42 are in the positions shown in Fig. 8, it will be evident that an initial impulse, one microsecond in length, is produced when the coil $a$ is energized. The next impulse begins four microseconds later when coil $c$ is energized. A third impulse will begin eight microseconds after the initiating impulse, namely, when coil $e$ is energized. The last impulse will be produced approximately twelve microseconds after the initiating impulse, namely, when coil $g$ is energized. The four impulses are amplified individually to the required degree by the vacuum tube amplifiers 38, 43, 44, 45 and passed on to the radar transmitter. These amplifier tubes are arranged to exercise a limiting action to compensate for any small attenuation of the compressional wave pulse in tube 20 while the pulse is traveling past the various coils. The outgoing impulses should thus be as nearly identical as possible in both amplitude and time width. The transmitted impulse, which forms the coded recognition signal, will thus comprise a series of four one microsecond pulses with spaces of three microseconds between them. By selecting different groups of coils by means of switch 39, codes having differently spaced unit impulses can be obtained readily.

The coded pulse will be received by the target station 2, at which station the impulses are passed through a suitable receiver-amplifier 8, Fig. 1. The last amplifying tube of the receiver-amplifier may be represented by amplifier tube 63 in Fig. 9. The received coded impulse is then passed to a decoding device diagrammatically indicated at 28, which is substantially similar to the coding device 27 at station 1, except that a separate initiating coil $k$ is used and the corresponding coils on opposite sides of the initiating coil are connected series aiding only when they are in use for the receipt of the selected code. Coils which are not used by the selected code are connected in series opposition. The code which is to be received is set up on a code selecting switch 64 corresponding to switch 39 in Fig. 8.

The switch 64 could be a simple switch like the switch 39 in Fig. 8, but in order to obtain greater selectivity I prefer to use a switch whereby the coils not used by the selected code will be active to prevent an indication should false signals be received. To this end switch 64 has three switch elements 65, 66, 67 corresponding to the three switch elements 40, 41, 42 of switch 39 in Fig. 8.

However, each of the switch elements 65, 66, 67 has four switch arms simultaneously operated to make contact with one of three contact studs. Each switch element has an indicating arm 68, 69, 70, respectively, with the three positions marked to correspond with the elements of the code corresponding to the markings of switch 39 in Fig. 8. Thus switch element 65 has the three positions 0, $b$, $c$; similarly switch element 66 has the three positions 0, $d$, $e$ and switch element 67 has the three positions 0, $f$, $g$. If the selected code, as set up on the switch 39 in Fig. 8, included the coil elements $a$, $c$, $e$ and $g$, the switch 64 is similarly set so that an indication will be produced only if the coils $a$, $c$, $e$ and $g$ in the decoding device 28 are simultaneously activated and if the remaining coils at that instant are not energized.

In the decoding device 28 correspondingly positioned coils on the left and on the right of the energizing coil $k$ are connected in series aiding. A separate amplifier is provided for each pair of coils. Each amplifier comprises a cathode follower tube and a class A amplifier. The cathode followers are numbered, in Fig. 9, 63a to 63g, inclusive, and the class A amplifiers numbered 73a to 73g, inclusive. The latter are all connected in parallel so that their combined outputs energize final amplifier tube 72, which may directly operate an indicating device such as the signal indicator 15 or the cathode ray tube or the keying oscillator 10, all in Fig. 1.

The tube 72 is biased far below cutoff so that only the summation of sufficient voltage impulses corresponding to the number of coils in the selected code can produce an indication. The switch 64 serves to connect pairs of coils in the selected code across the grids and cathodes of their respective amplifiers in such polarity as to make the grids positive when signals are received. The switch at the same time connects pairs of coils not being used by the selective code to their respective amplifiers in such polarity as to make the grids negative. It will thus be evident that in order to produce operation of the indicating device it is necessary that all the coils in the selected code be energized simultaneously. Moreover, only in this case will an indication be produced, for, if non-selected coils should be energized at the same time, the total voltage appearing at the grid of amplifier 72 will be reduced below that necessary for the operation of the tube.

Figure 9:
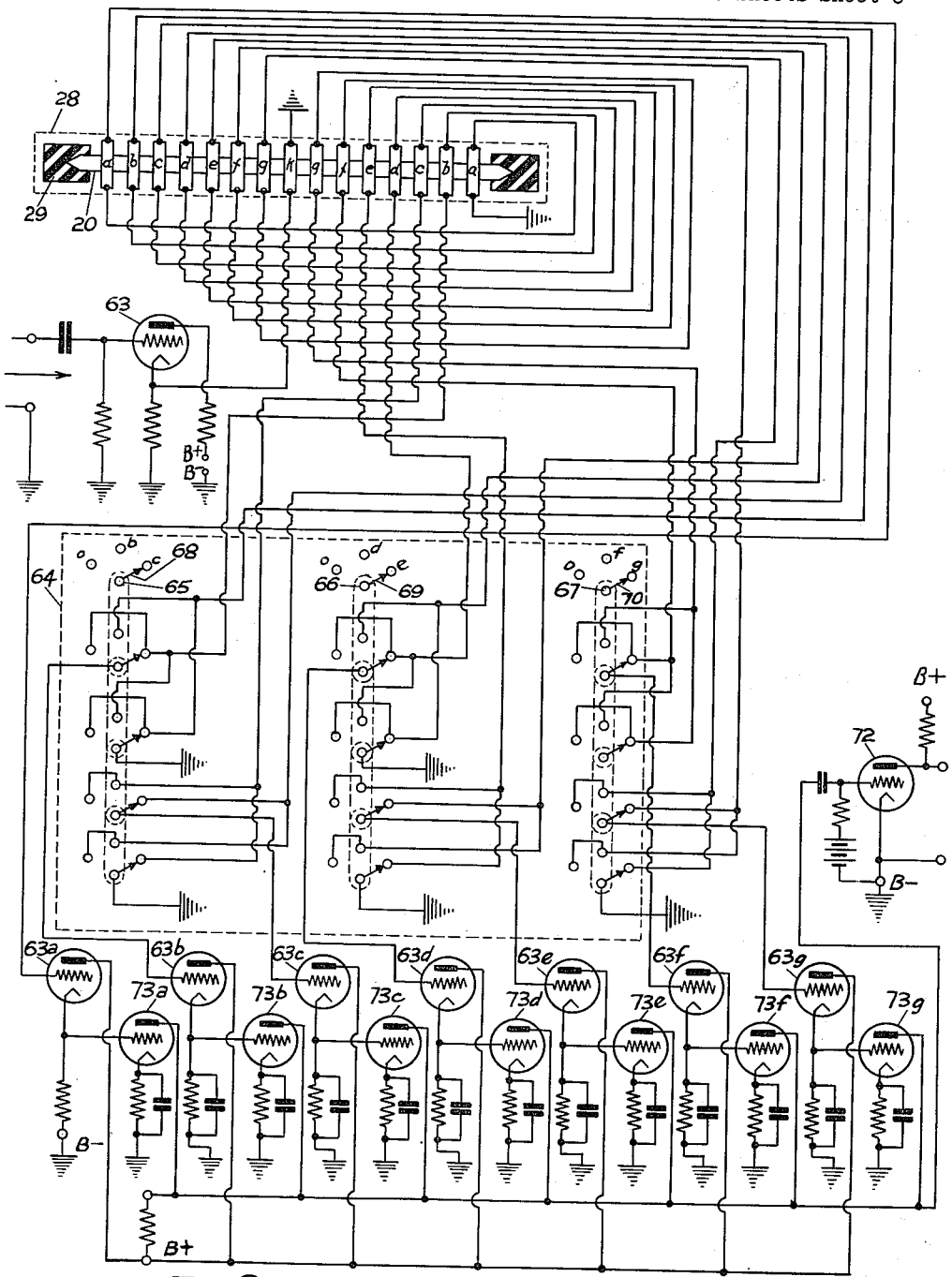
Fig. 9 is a schematic wiring diagram of receiving portions of my system.

The system shown in Fig. 9 may be used both at stations 1 and 2 in Fig. 1, in which case it will represent the elements 9 and 14.

Summarizing my system, it will be seen that I provide for the transmission, for example, from the radar transmitter, of a coded pulse instead of the usual single-valued pulse. This coded pulse is capable of variation in the time-space relations between the elements of the pulse in a large number of combinations by the simple setting of three dials each having three positions. Additional dials and additional dial positions may of course be provided if a more complex code is desired. My invention further involves the use at a target station of a receiving system preferably having 360° coverage and which is capable of responding only to a coded pulse precisely the same as that transmitted by the transmitting station. The wrong setting of any dial by as much as one position in the code must result in the rejection of the signal and failure to operate the indicator. In the simplest form of my invention it is, of course, sufficient to have transmission of the coded pulse from one station and its reception at a target station with the operation of an indicator at the latter. For many purposes, however, it will be preferable to use a more complete system such as that illustrated in Fig. 1, where the coded pulse transmitted by station 1 and received by station 2 actuates a new transmitter at station 2, transmitting a differently coded pulse which in turn is received at station 1 with a properly adjusted decoder to produce a final indication at station 1. Positive identification, in wartime, of friendly aircraft and ships can thereby be made.

The magnetostrictive coder and decoder above described probably offers the simplest and most easily duplicated device and one which can be produced in quantity with precision and at low cost. As above mentioned, it is only necessary that the magnetostrictive element be uniform in cross section and be acoustically and magnetically homogeneous. The former can be obtained by using an accurately-made cold drawn tube of nickel or a nickel alloy having a low temperature coefficient. Homogeneity can be assured by properly annealing the tube; if of nickel, the tube may be annealed at 1100° for two hours. As an example, but without limitations, it is suggested that a nickel tube may be used having an outer diameter of ¼ inch and an inner diameter of 0.2 inch with a cross sectional area of 0.1135 square centimeter. Such a tube will have a characteristic impedance of 4,350,000 dynes per kine or mechanical ohms per square centimeter. With such a tube a losser device on each end must provide a resistive load of 493,500 mechanical ohms. This should contribute no mass or stiffness to the system. It is believed that suitable high loss materials cycle welded to the tube will present such a load which will prevent compressional wave reflections from the ends of the tube. The desired polarizing flux in the nickel tube is in the vicinity of 3,900 gauss.

Figure 7:
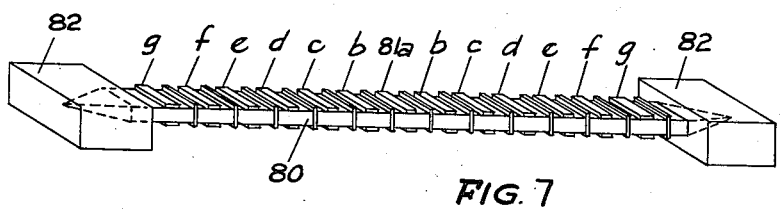
Fig. 7 is a perspective view of a modification of the device shown in Fig. 2 illustrated without an enclosing casing.

In place of using a magnetostrictive tube, the phenomena of piezoelectricity may be employed. For instance, a rod of quartz may be used having a series of electrodes along the rod to give the desired time delays. Such a device is shown in perspective in Fig. 7. The quartz element 80 has a center electrode 81a to which the initiating impulse is applied. This produces a compressional wave impulse which travels along the crystal to the left and to the right of electrode 81a. As it does so, it produces electric potentials successively at the electrodes *b* to *g* on the left and *b* to *g* on the right. The various electrodes may be connected in pairs in series aiding, and the pairs to individual amplifiers through a switching device in a manner similar to that shown for the magnetostrictive acoustic line shown in Fig. 8. Similarly for a decoding device the piezoelectric element may be arranged in a circuit similar to that shown in Fig. 9.

It will be observed that the crystal element 80 has its ends cemented into blocks of losser material 82 to prevent reflection of the acoustic impulses from the ends of the crystal.

While I prefer to use an acoustic delay line for the production of the coded impulses, such as a magnetostriction line or a piezoelectric crystal line, it is also possible to generate the coded pulses with an electric delay line. In this case the same principle of examining the coded impulse as a whole is involved. In general, for the coder, a single rectangular microsecond pulse is put into the input of an electric retardation line having enough sections to give the desired total delay time. The line is terminated at both ends with its characteristic impedance so that the standing wave ratio on the line is low and there are no reflections. Suitable mixer tubes have their grids connected by a switch, similar to switch 39 as described with reference to Fig. 8, to the proper points on the electric line to excite the grids in turn at the proper delay intervals. In decoding the coded pulse is impressed upon the line, an indication being produced only if code pulse elements appear at selected sections of the line. A circuit substantially like that of Fig. 9 with the electric delay line substituted for the magnetostriction element 28 may be used.

It will be understood that both with acoustic delay lines or with an electric delay line it is possible to use a single-ended device, although in general this will be less efficient for a recognition signal system. However, variably spaced pulses can also be obtained by using a magnetostriction tube suitably terminated with losser elements and having a fixed initiating coil and a sliding pickup coil.

Moreover, the generation of a pulse at varying times after a fixed pulse in the same coil may be effected by using only one losser at one end of the tube, the other end being left free so as to completely reflect the compressional wave pulse. By varying the length of the tube between the center of the initiating coil and the reflecting end of the tube by sliding the coil along the tube, an adjustment can be made so that the reflected pulse will reach the initiating coil at any desired time after the initiating pulse. The variation in pulse time will be a linear function of the displacement of the coil on the tube.

Such a reflection type of magnetostriction acoustic delay line may be used for various purposes; it may, for example, be used in a blocking oscillator to regulate pulse widths in accordance with well-known methods. An example of such use is shown at 58 in Fig. 8 as previously described. As such the acoustic delay line replaces the electrical delay line previously used, with the advantages that the pulse length is adjustable within narrow limits by a simple mechanical motion of the coil over the magnetostriction tube, and the pulse length is not affected by line voltage changes.

While my invention has been described with particular reference to a "friend or foe" identification system it obviously also has application to other identification or selective signaling systems. For example, a sea coast may be equipped with many identifying radar beacons constructed in accordance with the invention herein described. These beacons will answer when interrogated by the proper code and will send back their own code number. With such a system the captain of a vessel approaching an unknown coast can set up on his scanning radar the code of the desired beacon. When the beacon comes within range it will show brightly on the radar cathode ray tube screen. By interrogating three beacons a ship's navigator can, by triangulation, obtain his exact position. Other modifications and applications of my invention will be apparent to those skilled in the art.

Having now described my invention, I claim:

1. System of signaling comprising means at a first location for transmitting a group of chronologically spaced wave energy impulses representative of a first coded signal, means at a second location for receiving a signal which may include random wave energy pulses in addition to said impulses while maintaining their chronological spaced relationships, means responsive to the simultaneous presence of all of said impulses in said receiving means for producing a code-responsive signal, means responsive to the presence of said random wave energy pulses in said receiving means to produce a second signal, means employing said second signal to prevent operation of said code-responsive signal, means at said second location responsive to said code-responsive signal for transmitting a second group of chronologically-spaced wave energy impulses representative of a second coded signal different from the first coded signal, means at said first location for receiving a signal which may include extraneous wave energy pulses interspersed among said second coded signal impulses in addition to said impulses, indicator means responsive only to the simultaneous presence in said first location receiving means of all said second coded signal impulses, means responsive to the presence in said first location receiving means of said extraneous pulses to produce an extraneous pulse signal, and means to apply said extraneous pulse signal to said indicator means to prevent the operation thereof.

2. System of signalling comprising first means at a first station for transmitting a first group of chronologically-spaced wave energy impulses which are spaced apart in time in accordance with a first selected code, first receiving means at a second station to receive said first group, means responsive to the simultaneous presence in said first receiving means of all the impulses of said first group to produce a first code responsive signal, second means at said second station for transmitting a second group of chronologically-spaced wave energy impulses which are spaced apart in time in accordance with a second selected code, said second transmitting means being rendered operative by said first code responsive signal, second receiving means at said first station to receive said second group, means responsive to the simultaneous presence in said second receiving means of all the impulses of said second group to produce a second code responsive signal, an indicator connected to said second receiving means, and connections to operate said indicator with said second code responsive signal.

3. System according to claim 2 wherein each receiving means includes means for delaying the first and each successive impulse of the received group exclusive of the last impulse a time equal to the elapsed time between the pulse which is delayed and said last impulse, and thereby to present all the impulses of the received group simultaneously to the means to produce a code responsive signal.

EDWIN E. TURNER, Jr.

References Cited in the file of this patent

UNITED STATES PATENTS

| Number | Name | Date |
|---|---|---|
| 2,134,716 | Gunn | Nov. 1, 1938 |
| 2,361,437 | Trevor | Oct. 31, 1944 |
| 2,401,094 | Nicholson | May 28, 1946 |
| 2,412,974 | Deloraine | Dec. 24, 1946 |
| 2,414,992 | Wheeler | Jan. 28, 1947 |
| 2,415,359 | Loughlin | Feb. 4, 1947 |
| 2,415,667 | Wheeler | Feb. 11, 1947 |
| 2,419,571 | Labin et al. | Apr. 29, 1947 |
| 2,425,600 | Coykendall | Aug. 12, 1947 |
| 2,482,544 | Jacobsen | Sept. 20, 1949 |
| 2,515,178 | Barchok | July 18, 1950 |
| 2,531,412 | Deloraine | Nov. 28, 1950 |
| 2,537,102 | Stokes | Jan. 9, 1951 |